United States Patent [19]

Sundaresan

[11] Patent Number: 5,870,747
[45] Date of Patent: Feb. 9, 1999

[54] GENERALIZED KEY INDEXES

[75] Inventor: Prakash Sundaresan, Portland, Oreg.

[73] Assignee: Informix Software, Inc., Menlo Park, Calif.

[21] Appl. No.: 677,490

[22] Filed: Jul. 9, 1996

[51] Int. Cl.$^6$ .................................................. G06F 17/30
[52] U.S. Cl. .......................................... 707/101; 395/683
[58] Field of Search .............................. 707/1, 8, 3, 203, 707/101; 395/683

[56] References Cited

U.S. PATENT DOCUMENTS

| | | | |
|---|---|---|---|
| 5,278,978 | 1/1994 | Demers et al. | 707/101 |
| 5,440,730 | 8/1995 | Elmasri et al. | 707/203 |
| 5,440,732 | 8/1995 | Lomet et al. | 707/1 |
| 5,604,899 | 2/1997 | Doktor | 707/3 |
| 5,625,815 | 4/1997 | Maier et al. | 707/8 |
| 5,732,270 | 3/1998 | Foody et al. | 395/683 |

OTHER PUBLICATIONS

Fotouhi et al., "The Generalized Index Model for Object–Oriented Database Systems", Computers and Communications, 1991 Int'l Phoenix Conf., pp. 302–308.

Seshadri et al. "Generalized Partial Indexes", Data Engineering, 1995 11th Int'l Conf., pp. 420–427.

Antoshenkov, Gennady "Dynamic Optimization of Index Scans Restricted by Booleans", Data Engineering, 1996 12th Int'l Conf., pp. 430–440.

Kuno et al. "Augmented Inherited Multi–Index Structure for Maintenance of Materilized Path Query Views", Research Issues in Data Engineering, 1996 Workshop, pp. 128–137.

Sartori et al. "Partial Indexing for Nonuniform Data Distribution in Relational DBMS's", IEEE Transactions on Knowledge and Data Engineering, v. 6, n. 3, pp. 420–429, Jun. 1994.

Elmasri et al. "A Temporal Model and Query Language for ER Databases", Data Engineering, 1990 6th Int'l Conf., pp. 76–83.

Kolovson et al. "Indexing Techniques for Historical Databases", Data Engineering, 1989 5th Int'Conf., pp127–137.

*Primary Examiner*—Thomas G. Black
*Assistant Examiner*—Charles L. Rones
*Attorney, Agent, or Firm*—Fish & Richardson P.C.

[57] ABSTRACT

Generalized key indexes enable a first table of a relational database to be indexed using an index key and index conditions, wherein either or both of the index key and index conditions may reference multiple tables of the database or may be an expression using fields of one or more tables other than the first table. The generalized key indexes directly associate generalized index key values with record identifiers of records of the first table, thus enabling efficient storage and data retrieval.

14 Claims, 9 Drawing Sheets

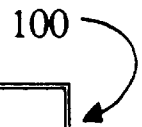
CUST table
Figure 1: Prior Art
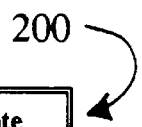
ORD table
Figure 2: Prior Art
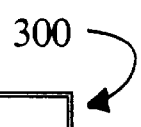
ITEM table
Figure 3: Prior Art

| 410a | CUST.cust_name | CUST.RID | 410b |
|---|---|---|---|
| 420a | Brown | 001 | 420b |
| 430a | Johnson | 000 | 430b |
| 440a | Smith | 002 | 440b |
| 450a | Taylor | 003 | 450b |

Cust_Name_Index

Figure 4: Prior Art

| 510a | CUST.cust_no | ORD.RID | 510b |
|---|---|---|---|
| 520a | 1001 | 100 | 520b |
| 530a | 1002 | 101, 102 | 530b |

Figure 5: Prior Art

| 610a | ORD.ord_no | ITEM.RID | 610b |
|---|---|---|---|
| 620a | 001 | 200 | 620b |
| 630a | 002 | 201, 202 | 630b |
| 640a | 003 | 203 | 640b |

Figure 6: Prior Art

| (ORD.price - ORD.discount) | ORD.RID |
|---|---|
| 44,000.00 | 102 |
| 45,000.00 | 100 |
| 100,000.00 | 101 |

VC_Index

Figure 7: Prior Art

| ORD.date | ORD.RID |
|---|---|
| 120195 | 102 |
| 122095 | 101 |

Partial_Index

Figure 8: Prior Art

| 1010a | CUST.cust_name | ITEM.RID | 1010b |
|---|---|---|---|
| 1020a | Brown | 200 | 1020b |
| 1030a | Smith | 201, 202, 203 | 1030b | cust_items index

Figure 10

| (ORD.price - ORD.discount) * (1 + ORD.tax) | CUST.RID |
|---|---|
| 48,400.00 | 002 |
| 49,500.00 | 001 |
| 110,000.00 | 002 | cust_expenditure index

Figure 11

| CUST.cust_name, ORD.date | ITEM.RID |
|---|---|
| Brown, 122095 | 200 |
| Smith, 120195 | 203 |
| Smith, 122095 | 201, 202 | cust_date_item index

Figure 12

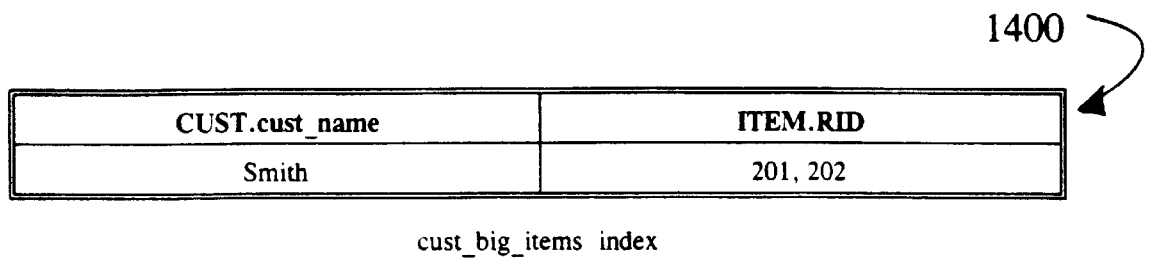
Figure 14
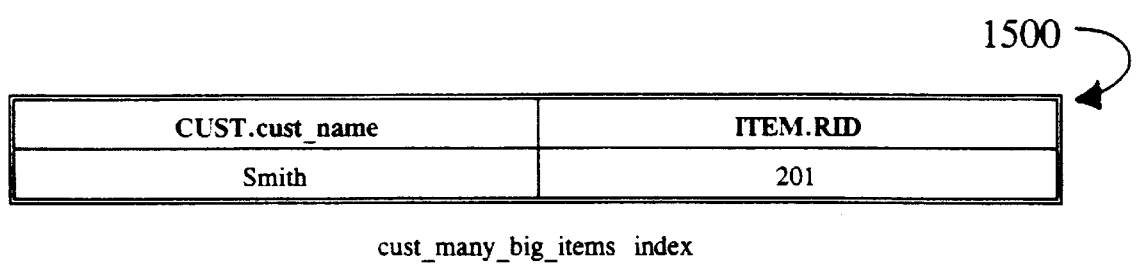
Figure 15
| | cust_items (1000) | cust_big_items (1300) | cust_many_big_items (1400) |
|---|---|---|---|
| Q1 | Yes | No | No |
| Q2 | Yes | Yes | No |
| Q3 | Yes | Yes | Yes |
Figure 16

| ITEM.quantity | ITEM.RID |
|---|---|
| 5 | 202 |
| 30 | 201 |
| 45 | 200 |
| 50 | 203 |

Figure 17

| ITEM.ord_no | ITEM.RID |
|---|---|
| 001 | 200 |
| 002 | 201, 202 |
| 003 | 203 |

Figure 18

GENERALIZED KEY INDEXES

BACKGROUND

The invention relates generally to relational database systems, and more particularly to indexing in relational database systems.

Users perceive a relational database as a collection of tables, each of which arranges data for items and item attributes in rows and columns: a table row corresponds to an item (referred to as a record); a table column corresponds to an attribute of the item (referred to as a field). A table record can generally be identified by a record identifier (RID), indicating the page and offset within the page where the record is stored.

FIGS. 1–3 illustrate examples of tables in a relational database. Data stored in the tables can be accessed using indexes such as those illustrated in FIGS. 4–6, which aid in accessing data by providing a logical ordering of the table records. FIG. 4 illustrates a conventional index 400 on the CUST table 100 of FIG. 1, using the customer name 410a as the index key. Index 400 provides an alphabetical ordering of the records of CUST table 100 by customer name 120, and associates each name 410a with record identifiers 410b for table records having the customer name in their cust_name field 120.

A query for phone numbers of customers named Smith would normally be processed by searching index 400 for an entry having the key value "Smith" 440a, using the associated record identifier 440b to retrieve a record in CUST table 100, and extracting data in the cust_phone field 140 of the retrieved record. Because index 400 is ordered by customer name, the index search is faster than the linear search of CUST table 100 that would be required without an index. Indexes may be implemented using various methods such as B-Trees and hash functions.

As exemplified by index 400, index entries generally have two attributes: an index key value, and record identifiers of table records. An index key generally is a field or a combination of fields from a table, and each index entry associates a key value with record identifiers of table records.

Conventional indexes are single-table, associating key values based on table fields with record identifiers of records of that same table. Index 400 of FIG. 4 is an example of a single-table index. Various types of single-table indexes exist. FIG. 7 illustrates an example of a "virtual column" index, created by defining the index key as an expression using one or more fields of a table record. For example, to order the records of the order table ("ORD table") of FIG. 2 by price including discount, a virtual column index is created using the index key (ORD.price–ORD.discount).

Another type of single-table index is a "partial index," which indexes only those table records satisfying a specified condition. For example, FIG. 8 illustrates an index associating values for ORD.date only with record identifiers of table records having a price of at least $50,000.00.

In relational database systems, an index may also be multi-table, using fields from a first table in its index key, and associating index key values with record identifiers of records of a second table. Multi-table indexes are generally referred to as join indexes.

FIGS. 4–6 together illustrate an implementation of an index for retrieving index records based on customer name, created on the ITEM table 300 (FIG. 3), using the name field 120 from the CUST table 100 as an index key (CUST.cust_name). As shown, this index has three levels. The first level (index 400, FIG. 4) associates values for CUST.cust_name 410a with record identifiers of records of the CUST table 410b; the second level (index 500, FIG. 5) associates values for CUST.cust_no 510a with record identifiers of records of the ORD table 510b having the same value for ORD.cust_no; and the third level (index 600, FIG. 6) associates values for ORD.ord_no 610a with record identifiers of records of the ITEM table 610b having the same value for the ITEM.ord_no.

Indexes 400–600 aid in retrieving item records corresponding to a customer name. For example, to retrieve item records for a customer Smith, index 400 is used to retrieve the CUST.cust_no (1002) of the CUST records corresponding to Smith (002); index 500 is used to retrieve the ORD.ord_no (002, 003) of the ORD records (101, 102) corresponding to the CUST.cust_no (1002); and finally, index 600 is used to retrieve the ITEM records (201, 202, 203) corresponding to the ORD.ord_no (002, 003).

Although such multi-table indexes do simplify accessing data in relational database systems, conventional indexing for relational databases has limitations. For example, a conventional index associating key values of fields of a first table with record identifiers of records of a second table generally has more than one level, as illustrated by FIGS. 4–6.

A consequence of having multiple levels in multi-table indexes is that such indexes require more memory space than single-table indexes. Another consequence of having multiple levels is that more processing is required to handle queries. For example, retrieving item records corresponding to a customer name "Smith" requires multiple processing steps.

SUMMARY

In general, in one aspect, the invention features a computer-implemented method for creating an index for a first table in a multi-table relational database based on an index key and index conditions by determining index key values, wherein if the index key references tables other than the first table, the method further comprises retrieving data from the other tables to determine the index key values; associating each determined index key value with record identifiers of records of the first table satisfying the index conditions, wherein if the index conditions reference tables other than the first table, the method further comprises retrieving data from the other tables to determine the associated record identifiers; and storing the index key values and the associated record identifiers in an index.

Embodiments of the invention may include one or more of the following features. The index key references at least a second table and a third table. The index conditions reference at least a second table and a third table. The index key is an expression referencing at least a second table.

In another aspect, the invention features a computer-implemented method for creating an index for a first table in a multi-table relational database based on an index key by determining index key values, wherein the index key comprises an expression referencing at least a second table; associating each determined key value with record identifiers of the records of the first table; and storing the index key values and the associated record identifiers in an index.

In another aspect, the invention features a computer-implemented method for determining the applicability of an index for processing a query in a multi-table relational database, wherein the index indexes an index table based on an index key and index conditions, the query is based on query conditions referencing a set of query tables, and each of the tables are tables of the multi-table relational database. This method comprises determining whether the index table is one of the query tables; determining whether the index conditions are less or equally restrictive as compared with the query conditions; and determining the index to be applicable for processing the query if the index table is one of the query tables and the index conditions are less or equally restrictive as compared with the query conditions.

Embodiments of the invention may include a method in which determining whether the index conditions are less or equally restrictive as compared with the query conditions comprises determining whether each index condition is satisfied by at least one query condition.

In another aspect, the invention features a computer-implemented method of processing a query on a set of query tables in a relational database by retrieving an index comprising index entries having index key values and associated record identifiers of records of a first query table in the set of query tables, wherein the association between index entries and associated record identifiers is based on at least a second query table and a third query table in the set of query tables; determining an index key value based on the query; determining an index entry corresponding to the determined index key value; and retrieving records of the first query table based on the associated record identifiers of the determined index entry.

In another aspect, the invention features a computer-implemented method of processing a query on a set of query tables in a relational database by retrieving an index comprising index entries having index key values and associated record identifiers of records of a first query table in the set of query tables, wherein the index key values are based on an expression referencing at least a second query table in the set of query tables; determining an index key value based on the query; selecting an index entry corresponding to the determined index key value; and retrieving records of the first query table based on the selected index entry.

In another aspect, the invention features an index stored on a processor-readable medium, for enabling a programmable processor to order records of a first table of a multi-table relational database based on an index key and index conditions, the index comprising index key values and associated record identifiers for records of the first table satisfying the index conditions, where at least one of the index key and the index conditions reference a second and a third table of the multi-table relational database.

In another aspect, the invention features an index stored on a processor-readable medium, for enabling a programmable processor to order records of a first table of a multi-table relational database based on an index key, the index comprising index key values and associated record identifiers for records of the first table, where the index key is an expression referencing at least a second table of the multi-table relational database.

The advantages of the invention include one or more of the following. The generalized key indexing system may be implemented in a single level, achieving efficient storage and enabling efficient query processing. The generalized key indexes also enable indexing on a variety of index keys, including, for example, expressions using fields of more than one table.

Furthermore, the generalized key indexes are flexible enough to encompass a variety of index formats, including conventional single-table indexing. Relational database systems may be readily adapted to create and handle both generalized key indexes and conventional indexes.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the claims.

BRIEF DESCRIPTION OF THE DRAWINGS

The accompanying drawings, which are incorporated in and constitute a part of the specification, schematically illustrate the invention and, together with the general description given above and the detailed description given below, serve to explain the principles of the invention.

FIGS. 1–3 illustrate tables of a relational database.

FIGS. 4–8 illustrate indexes.

FIGS. 10–12 illustrate indexes.

FIGS. 14 and 15 illustrate indexes.

FIG. 16 shows the applicability of indexes to given queries.

FIGS. 17 and 18 illustrate indexes.

DESCRIPTION OF THE PREFERRED EMBODIMENT

Figure 9:
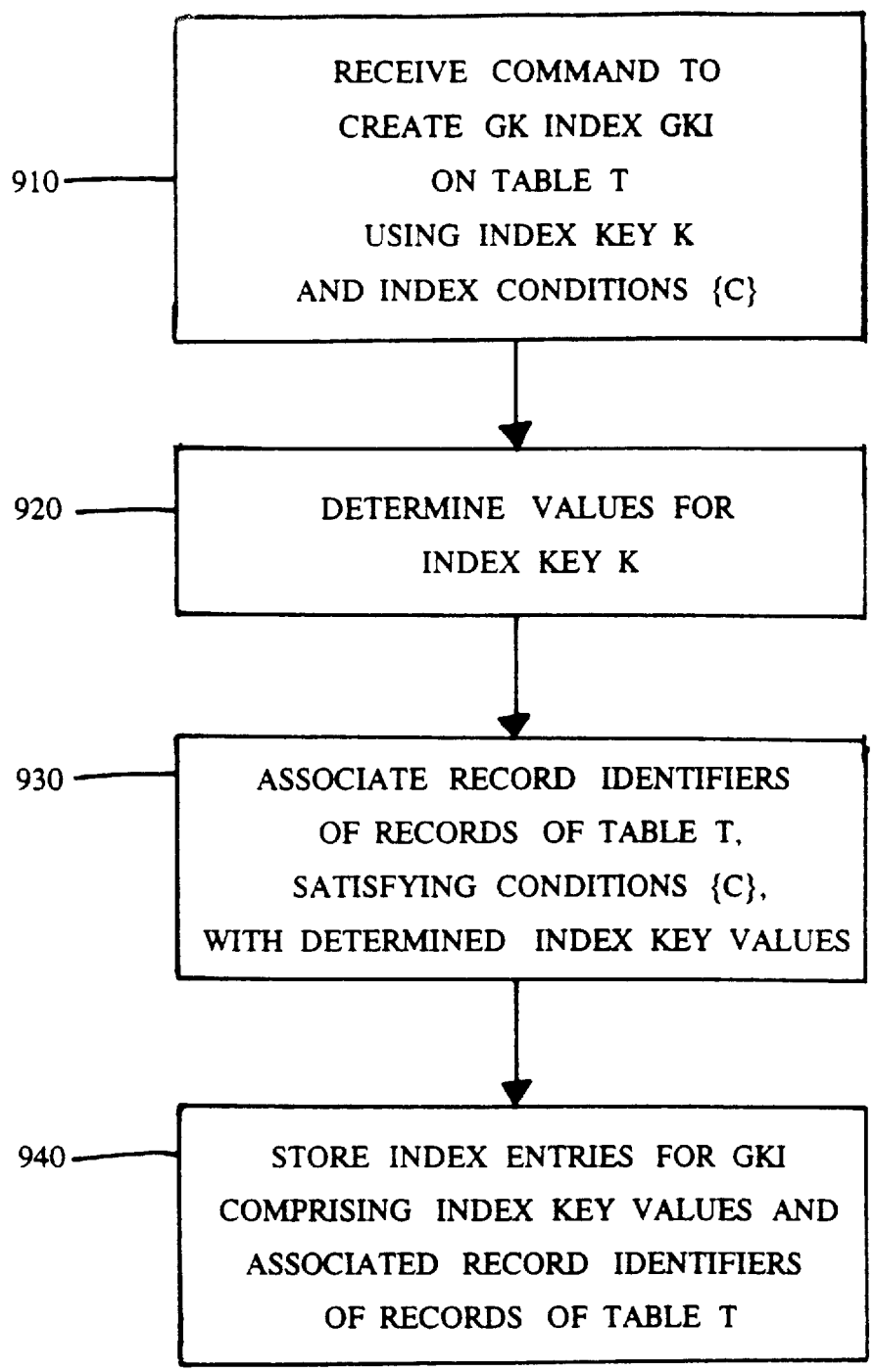
FIG. 9 is a flow diagram of a method of creating a generalized key index.

The invention provides a generalized use of indexing in relational database systems. Generalized key indexes ("GK indexes") encompass conventional indexes—including single-table indexes such as virtual column indexes and partial indexes, as well as multi-table indexes—and enable different techniques used in conventional indexes to be combined in a single index. GK indexes further provide enhanced capabilities to create customized indexes that are efficiently stored and enable efficient query processing.

In one embodiment, a GK index is created by a user command having the general format:

| | |
|---|---|
| CREATE GK-INDEX | <index-name> |
| ON | <table-name> |
|    (SELECT AS KEY | <key-list> |
|    FROM | <other-table-list> |
|    WHERE | <condition-list>) | where the parameters are as follows:

| | |
|---|---|
| index-name: | identifies the index being created |
| table-name: | identifies the table whose records are being indexed. |
| key-list: | includes one or more fields from one or more tables of the relational database. |
| other-table-list: | includes each table, other than the table corresponding to table-name, having a field referenced either in the key-list or the condition-list. If the index being defined is a single-table index, this list may be empty. |
| condition-list: | includes zero or more conditions (expressions) to be satisfied. This list may be empty. |

One embodiment creates a GK index from such a statement as if processing a query and storing the results. For example, the general format for creating a GK index may be expressed as the query:

```
SELECT      <key-list>, <table-name>.RID
FROM        <other-table-list>, <table-name>
WHERE       <condition-list>
ORDER BY    <order-list>
``` where <table-name>.RID references the table records and the <order-list> generally reflects the fields as ordered in the key-list.

GK indexes may be used to create conventional single-table indexes, including virtual column indexes and partial indexes. In an implementation using the above format, single-table GK indexes are created by statements such as:

```
CREATE GK-INDEX        <index-name>
ON                     <table-name>
    (SELECT AS KEY     <key-list>
     WHERE             <condition-list>)
``` which may be expressed as the query:

```
SELECT      <key-list>, <table-name>.RID
FROM        <table-name>
WHERE       <condition-list>
ORDER BY    <order-list>
```

Thus, for example, the standard one-table index discussed with reference to FIG. 4 indexing the CUST table by name would be created by a statement such as:

```
CREATE GK-INDEX        Cust_Name_Index
ON                     CUST
    (SELECT AS KEY     CUST.cust_name)
``` which may be expressed as the query:

```
SELECT      CUST.cust_name, CUST.RID
FROM        CUST
ORDER BY    CUST.cust_name
```

The virtual column index 700 discussed above with reference to FIG. 7 may be created by the statement:

```
CREATE GK-INDEX        VC_Index
ON                     ORD
    (SELECT AS KEY     (ORD.price - ORD.discount)
``` which may be expressed as the query:

```
SELECT      (ORD.price - ORD.discount)
            ORD.RID
FROM        ORD
ORDER BY    (ORD.price - ORD.discount)
```

Similarly, the partial index 800 discussed with reference to FIG. 8 may be created by:

```
CREATE GK-INDEX        Partial_Index
ON                     ORD
    (SELECT AS KEY     ORD.date
     WHERE             ORD.price ≧ 50,000.00)
``` which may be expressed as the query:

```
SELECT      ORD.date, ORD.RID
FROM        ORD
WHERE       ORD.price ≧ 50,000.00
ORDER BY    ORD.date
```

As indicated above, GK indexes encompass conventional single-table indexes. GK indexes may also be multi-table. In processing the query corresponding to a multi-table GK index, intermediate tables are referenced in determining the final association of GK index key values with record identifiers of records of the indexed table, but the GK index stores the end results.

Query processing methods have been extensively studied, and a variety of methods can be used to process a query corresponding to a "Create GK Index" command.

FIG. 9 is a flow diagram illustrating a method for creating a GK index. After receiving a command to create a GK index GKI on a table T (referred to above as <table-name>), using an index key K (referred to above as <key-list>) and index conditions {C} (referred to above as <condition-list>) (910), values for index key K are determined (920). For each index key value, associated record identifiers of table T satisfying the conditions {C} are determined (930). Index key values and their associated record identifiers are stored as index entries (940).

Determining associated record identifiers of records of table T for an index key value can reference an intermediate table (one of the tables in the <other-table-list>) other than T. For example, if a table in the <other-table-list> is referenced by the index key or in a condition of {C}, data from that other table will need to be retrieved. However, whether intermediate tables are referenced, the index stores the result of the mapping, directly correlating an index key value with associated record identifiers of records of indexed table T.

FIG. 10 shows a GK index 1000 associating customer names with record identifiers of item records, performing the same function as the indexes of FIGS. 4–6. As a result of a command such as:

```
CREATE GK-INDEX        cust_items
ON                     ITEM
    (SELECT AS KEY     CUST.cust_name
     FROM              CUST
     WHERE             CUST.cust_no = ORD.cust_no AND
                       ORD.ord_no = ITEM.ord_no)
``` the corresponding query:

```
SELECT      CUST.cust_name, ITEM.RID
FROM        CUST, ORD, ITEM
WHERE       CUST.cust_no = ORD.cust_no AND
            ORD.ord_no = ITEM.ord_no
ORDER BY    CUST.cust_name
``` is processed, creating the GK index 1000 of FIG. 10.

Like the index 400 of FIG. 4, GK index 1000 associates customer names with record identifiers of item records. However, as shown, GK index 1000 has only a single level, directly associating values for customer names from the CUST table with record identifiers of records of the ITEM table, eliminating reference to the ORD table.

Conventional multi-table indexes such as the indexes of FIGS. 4–6 have multiple levels referencing intermediate records to associate key values with record identifiers of table records. Not only do multiple levels result in larger memory requirements and slower access times, they also place some limitations on the types of indexes that can be created. For example, conventional multi-level multi-table indexing does not permit an index key to be based on fields of more than one table.

In contrast, because GK indexes have only a single level, directly associating GK index key values with record identifiers of table records, users have great flexibility in determining how the association is defined. For example, a GK index key may be created on a first table, using an index key that includes an expression using one or more fields of a second table. Referring to the tables of FIGS. 1–3, to determine customers who had made single order purchases having a particular total cost, GK index 1100 of FIG. 11 may be created as follows:

| CREATE GK-INDEX | cust_expenditure |
|---|---|
| ON | CUST |
| (SELECT AS KEY | ((ORD.price – ORD.discount) * (1 + ORD.tax)) |
| FROM | ORD |
| WHERE | ORD.cust_no = CUST.cust_no) | which would be processed as:

| SELECT | ((ORD.price – ORD.discount) * (1 + ORD.tax)), CUST.RID |
|---|---|
| FROM | ORD, CUST |
| WHERE | ORD.cust_no = CUST.cust_no |

GK index keys can also be created on fields from more than one table. For example, the following command would create GK index 1200 of FIG. 12, associating a combination of a customer name and an order date with record identifiers of the items purchased in that order:

| CREATE GK-INDEX | cust_date_item |
|---|---|
| ON | ITEM |
| (SELECT AS KEY | (CUST.cust_name, ORD.date) |
| FROM | CUST, ORD |
| WHERE | CUST.cust_no = ORD.cust_no AND ORD.ord_no = ITEM.ord_no) | which may be created by:

| SELECT | (CUST.cust_name, ORD.date), ITEM.RID |
|---|---|
| FROM | CUST, ORD, ITEM |
| WHERE | CUST.cust_no = ORD.cust_no AND ORD.ord_no = ITEM.ord_no |
| ORDER BY | CUST.cust_name, ORD.date |

These examples reflect the flexibility of generalized key indexing to create indexes customized to a user's specific needs.

To ensure continuing accuracy of a GK index after data is added, deleted, or altered in a table that was referenced to create that GK index, the GK index must be updated to verify that its entries are still accurate after the data change has occurred.

Various update methods exist and may be adapted to update GK indexes. One embodiment reconstructs a GK index when any of the referenced fields are altered, or deletes the GK index if the alteration is incompatible with the GK index (e.g., the field is deleted or changed to an incompatible data type). This method is especially suitable for data warehousing environments, in which data is not frequently updated.

A database system uses a GK index to access data by finding the GK index key value in the GK index and following associated record identifiers to the relevant table records. For example, using GK index 1000 of FIG. 10 to find item records for a customer named Smith, GK index 1000 is first searched for an entry for Smith 1030a, and the item records are retrieved by the corresponding record identifiers 1030b.

To use an index, relational database systems first determine whether that particular index is appropriately used to process a given query. Typically, database systems have a query optimizer responsible for determining which indexes, if any, are used to process a given query.

Generally, query optimizers determine whether to use a particular index for a given query by determining (1) whether the index is applicable to the query; and (2) whether the index is optimally used to process the query.

Consider, for example, the following query Q:

| SELECT | <query-select-list> |
|---|---|
| FROM | <query-table-list> |
| WHERE | <query-condition-list> | and GK index GKI, created as follows:

| CREATE GK-INDEX | GKI |
|---|---|
| ON | T |
| (SELECT AS KEY | <index-key-list> |
| FROM | <index-other-table-list> |
| WHERE | <index-condition-list>) |

Figure 13:
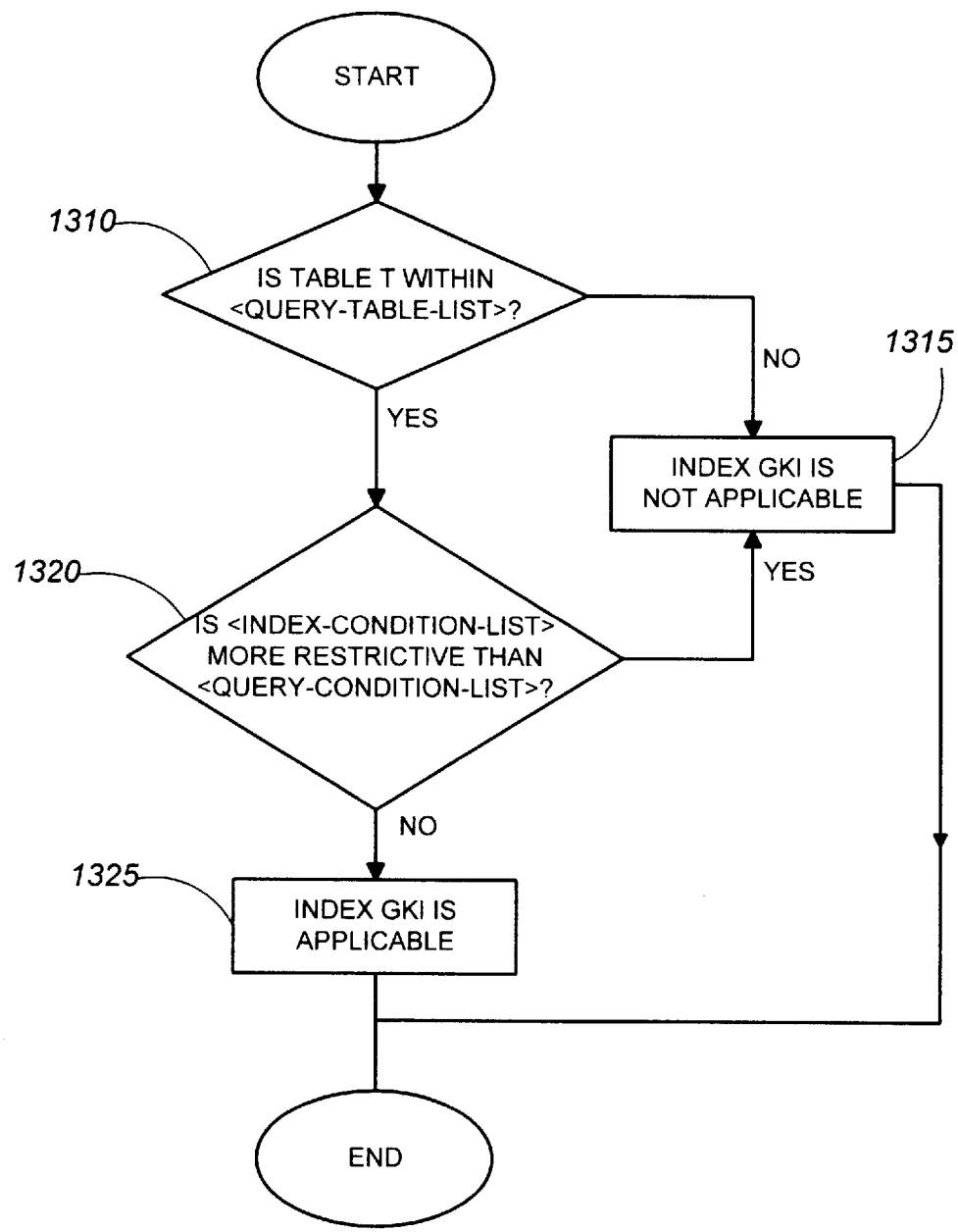
FIG. 13 is a flow diagram of a method of determining applicability of a generalized key index.

Generally, for a GK index to be applicable to a query, the table it indexes must be referenced by the query. FIG. 13 is a flow diagram illustrating the process in one embodiment of determining applicability. If the table T, indexed by GK index GKI, is not one of the tables in the <query-table-list> (1310), GK index GKI is not applicable to the query (1315). Similarly, if the <index-condition-list> is more restrictive than the <query-condition-list> (1320), GK index GKI is not applicable to the query (1315). Otherwise, GK index GKI is applicable to the query (1325).

The restrictiveness evaluation (1320) ensures that using the index GKI will not produce incomplete results, which could occur if the index GKI is created on more restrictive conditions than are required by the query. In one embodiment, whether the restrictiveness condition is satisfied is determined by evaluating whether each condition in the <index-condition-list> is satisfied by at least one condition of the <query-condition-list>.

The following example illustrates the concept of applicability. Using the tables of FIGS. 1–3, the following indexes are created:

(1) cust_items index: as illustrated in FIG. 10, cust_items index 1000 associates a customer name with record identifiers of item records for items purchased by that customer.

(2) cust_big_items index: illustrated in FIG. 14, cust_big_items 1400 associates a customer name with record identifiers of item records for items purchased by that customer in orders having a price of at least $50,000.00. This index may be created by:

```
CREATE GK-INDEX      cust_big_items
ON                   ITEM
  (SELECT AS KEY     CUST.cust_name
   FROM              CUST, ORD
   WHERE             CUST.cust_no = ORD.cust_no AND
                     ORD.ord_no = ITEM.ord.no AND
                     ORD.price ≥ 50,000.00)
```

3. cust_many_big_items: illustrated in FIG. 15, cust_many_big_items 1500 associates a customer name with record identifiers of item records for items which were purchased in quantities of at least ten, purchased by that customer in orders having a price of at least $50,000.00. This index may be created by:

```
CREATE GK-INDEX      cust_many_big_items
ON                   ITEM
  (SELECT AS KEY     CUST.cust_name
   FROM              CUST, ORD
   WHERE             CUST.cust_no = ORD.cust_no AND
                     ORD.ord_no = ITEM.ord.no AND
                     ORD.price ≥ 50,000.00 AND
                     ITBM.quantity ≥ 10)
```

The following queries are submitted on the database including the tables of FIGS. 1–3:

(1) Q1: Find item numbers and item quantities in orders by customer Smith. This query is formatted as:

```
SELECT    ITEM.item_no, ITEM.quantity
FROM      CUST, ORD, ITEM
WHERE     CUST.cust_name = "Smith" AND
          CUST.cust_no = ORD.cust_no AND
          ORD.ord_no = ITEM.ord_no
```

(2) Q2: Find item numbers and quantities of items in orders of at least $60,000.00 by customer Smith. This query is formatted as:

```
SELECT    ITEM.item_no, ITEM.quantity
FROM      CUST, ORD, ITEM
WHERE     CUST.cust_name = "Smith" AND
          CUST.cust_no = ORD.cust_no AND
          ORD.ord_no = ITEM.ord_no AND
          ORD.price ≥ 60,000.00
```

(3) Q3: Find item numbers and quantities of items purchased in quantities of at least 25 orders of at least $60,000.00 by customer Smith. This query is formatted as:

```
SELECT    ITEM.item_no, ITEM.quantity
FROM      CUST, ORD, ITEM
WHERE     CUST.cust_name = "Smith" AND
          CUST.cust_no = ORD.cust_no AND
          ORD.ord_no = ITEM.ord_no AND
          ORD.price ≥ 60,000.00 AND
          ITEM.quantity ≥ 25
```

The applicability of indexes 1000, 1400, and 1500 to queries Q1, Q2, and Q3 is illustrated in FIG. 16. Q1 requests information about all items purchased by Smith. Only index 1000 is applicable because the index conditions of indexes 1400 and 1500 are more restrictive than the query conditions and would not lead to complete results: The condition in index 1400 that ORD.price ≥50,000 is not satisfied by any condition of Q1. Accordingly, index 1400 indicates only items purchased by Smith in orders of at least $50,000.00.

Index 1500 includes conditions both that ORD.price ≥50,000 and that ITEM.quantity ≥10, neither of which are satisfied by any conditions of Q2. Thus, index 1500 indicates only items purchased by Smith in orders of at least $50,000.00.

This example also illustrates that an index having conditions more restrictive than query conditions can lead to incorrect results: the proper response to Q1, requesting all items purchased by Smith, corresponds to items 201, 202, 203; index 1400 would produce only items 201 and 202; index 1500 produces only item 201.

The concept of applicability is further illustrated by queries Q2 and Q3. Q2 requests items purchased by Smith in orders of at least $60,000.00. Index 1400 is applicable for Q2 because its condition that ORD.price ≥50,000.00 is satisfied by Q2 query condition that ORD.price ≥60,000.00. Index 1500 is not applicable because although its condition that ORD.price ≥50,000 is satisfied, its condition that ORD.quantity ≥10 is not satisfied by any condition of Q2.

Q3 requests items purchased by Smith in quantities greater than 25 in orders of at least $60,000.00. Index 1400 is applicable for the same reason it is applicable for Q2. Index 1500 is also applicable because the condition that ITEM.quantity ≥10 is satisfied by Q3 query condition that ITEM.quantity ≥25.

Once determining that an index is applicable to a given query, query optimizers generally determine whether the index is optimally used in processing the query. Although methods of optimization vary among query optimizers, a commonly used method is based on the Selinger optimizer algorithm, discussed in P. G. Selinger et al., An Access Specification Language for a Relational Data Base System, 1979 ACM SIGMOD INT'L CONF. ON MANAGEMENT OF DATA 23–34 (May/June 1979).

The basic idea of the Selinger algorithm is to enumerate possible execution plans for processing a given query, estimating the cost of each possible plan, and selecting the best plan (the plan having the least cost). Thus, processing the query:

```
SELECT    <query-select-list>
FROM      <query-table-list>
WHERE     <query-condition-list>)
``` where <query-table-list> is the set {T1, T2, . . . , Tn}, requires that all of the tables in <query-table-list> be joined. One possible Selinger optimizer generates plans for all permutations of tables of the query table set and estimates the cost for each permutation by starting with the first table in the permutation and estimating the cost of joining that table with a second table, adding that cost to the estimate of the cost of joining the result of the first join to a third table, and continues joining all tables of the tables set and calculating the accumulated estimated cost. The total cost also considers the cost of incorporating single-table conditions that do not require any joins. This process is repeated for every possible permutation.

Indexes can reduce the plan cost. Selinger optimizers generally use indexes to reduce the cost of joining a table, or to reduce the cost of determining a condition on a single table.

Referring the tables 100, 200, 300 of FIGS. 1–3, consider the query:

```
SELECT      CUST.name, ITEM.quantity
FROM        CUST, ORD, ITEM
WHERE       CUST.cust_name = "Smith" AND
            CUST.cust_no = ORD.cust_no AND
            ORD.ord_no = ITEM.ord_no AND
            ITEM.quantity ≧ 25
```

The table set is {CUST, ORD, ITEM}; the plans include the following possible permutations:

```
(1) {CUST, ORD, ITBM}
(2) {CUST, ITEM, ORD}
(3) {ORD, CUST, ITEM}
(4) {ORD, ITEM, CUST}
(5) {ITEM, CUST, ORD}
(6) {ITEM, ORD, CUST}
```

Index 1700 of FIG. 17 associates the field ITEM.quantity with ITEM.RID, and is helpful to process the condition ITEM.quantity ≧25. This condition references only the ITEM table, and therefore does not require that any other table be previously joined. Thus index 1700 can be used in each of plans (1)–(6) when the ITEM table is added.

Index 1800 of FIG. 18 associates the field ITEM.ord_no with ITEM.RID, and is useful to effect the condition ORD.ord_no=ITEM.ord_no, joining the ITEM table to the ORD table by the common ord_no fields. However, because this condition references the ORD table, index 1800 is used only to join the ITEM table if the ORD table has already been joined. Thus, index 1800 is used only in plans (1), (3), and (4).

Various methods of determining when to use GK indexes may be used to adapt Selinger optimizers to incorporate GK indexes into this algorithm. For example, in one embodiment, like conventional single-table indexes, a single-table GK index on a table T will always be considered when that table is joined. Multi-table GK-indexes will be considered when all of the tables referenced in the key-list have already been joined.

Query optimizers based on algorithms other than the Selinger algorithm can be similarly adapted to handle GK indexes, although the specific modifications may vary.

Other embodiments are within the scope of the following claims. For example, other embodiments may use different update methods. One embodiment, rather than deleting a GK index when an underlying table is altered, updates or recalculates the index.

Other possible variations include use different types of data structures may be used to represent the GK key indexes, including b-trees and bit-mapped indexes.

While the invention is described in terms of a software implementation, the invention may be implemented in hardware or software, or a combination of both. Preferably, the invention is implemented in a software program executing on a programmable processing system comprising a processor, a data storage system, an input device, and an output device.

Figure 19:
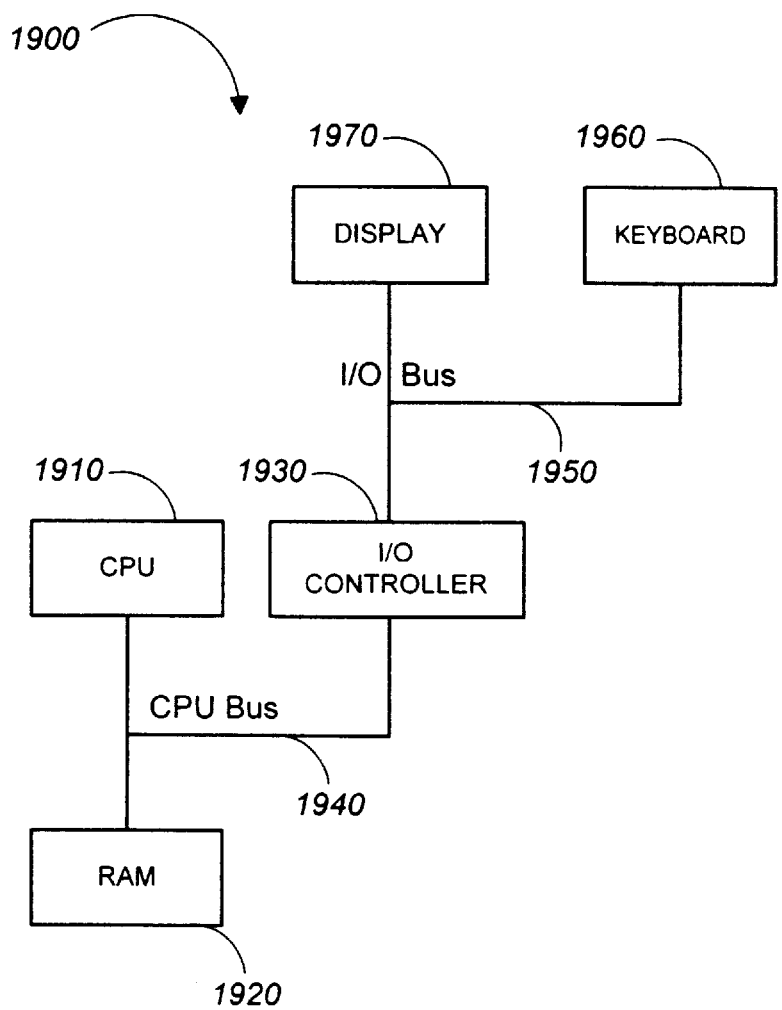
FIG. 19 illustrates a programmable processing system.

FIG. 19 illustrates one such programmable processing system 1900, including a CPU 1910, a RAM 1920, and an I/O controller 1930 coupled by a CPU bus 1940. The I/O controller 1930 is also coupled by an I/O bus 1950 to input devices such as a keyboard 1960, and output devices such as displays 1970.

The present invention has been described in terms of an embodiment. The invention, however, is not limited to the embodiment depicted and described. Rather, the scope of the invention is defined by the appended claims.

What is claimed is:

1. A processor-readable medium having code for Processing a multi-table relational database based on an index key, comprising:

index key values associated with the relational database; and record identifiers associated with the index key values for identifying records of the first table, wherein the index key is an expression referencing at least a second table of the multi-table relational database in ordering records of the multi-table relational database.

2. The index of claim 1, wherein the index key expression further references a third table.

3. A processor-readable medium having code for processing a multi-table relational database based on an index key and index conditions, comprising:

index key values associated with the relational database; and record identifiers associated with the index key values for identifying records of a first table satisfying the index conditions, wherein at least one of the index key values and the index conditions reference a second and a third table of the multi-table relational database in ordering records of the multi-table relational database.

4. A computer-implemented method of processing a query on a set of query tables in a relational database, comprising:

retrieving an index for the relational database comprising index entries having index key values and associated record identifiers of records of a first query table in the set of query tables, wherein the index key values are based on an expression referencing at least a second query table in the set of query tables;

determining an index key value based on the query;

selecting an index entry corresponding to the determined index key value; and retrieving records of the first query table based on the selected index entry.

5. A computer-implemented method for creating an index for a first table in a multi-table relational database based on an index key, the method comprising:

determining index key values of the relational database, wherein the index key comprises an expression referencing at least a second table;

associating each determined key value with record identifiers of the records of the first table; and storing the index key values and the associated record identifiers in an index.

6. The method of claim 5, wherein the index key expression further references a third table.

7. A computer-implemented method of processing a query on a set of query tables in a relational database, comprising:

retrieving an index for the relational database comprising index entries having index key values and associated record identifiers of records of a first query table in the set of query tables, wherein the association between index entries and associated record identifiers is based on at least a second query table and a third query table in the set of query tables;

determining an index key value based on the query;

determining an index entry corresponding to the determined index key value; and retrieving records of the first query table based on the associated record identifiers of the determined index entry.

8. A computer-implemented method for determining the applicability of an index for processing a query in a multi-table relational database, wherein the index indexes an index table based on an index key and index conditions, the query is based on query conditions referencing a set of query tables, and each of the tables are tables of the multi-table relational database, the method comprising:

determining whether the index table of the relational database is one of the query tables;

determining whether the index conditions are less or equally restrictive as compared with the query conditions; and determining the index to be applicable for processing the query if the index table is one of the query tables and the index conditions are less or equally restrictive as compared with the query conditions.

9. The method of claim 8, wherein determining whether the index conditions are less or equally restrictive as compared with the query conditions comprises determining whether each index condition is satisfied by at least one query condition.

10. A computer-implemented method for creating an index for a first table in a multi-table relational database based on an index key and index conditions, the method comprising:

determining index key values of the relational database, wherein if the index key references tables other than the first table, the method further comprises retrieving data from the other tables to determine the index key values;

associating each determined index key value with record identifiers of records of the first table satisfying the index conditions, wherein if the index conditions reference tables other than the first table, the method further comprises retrieving data from the other tables to determine the associated record identifiers; and storing the index key values and the associated record identifiers in an index.

11. The method of claim 10, wherein the index key value references at least a second table and a third table.

12. The method of claim 10, wherein the index conditions reference at least a second table and a third table.

13. The method of claim 10, wherein the index key is an expression referencing at least a second table.

14. The method of claim 13, wherein the index key expression further references a third table.

\* \* \* \* \*